United States Patent [19]

Banford et al.

[11] Patent Number: 5,055,513
[45] Date of Patent: Oct. 8, 1991

[54] POLYMER GRANULES AND COMPOSITIONS CONTAINING THEM

[75] Inventors: Jonathan Banford, Hartburn; Paul F. Dietz, Hartlepool, both of England

[73] Assignee: Tioxide Group PLC, London, England

[21] Appl. No.: 480,930

[22] Filed: Feb. 16, 1990

[30] Foreign Application Priority Data

Mar. 4, 1989 [GB] United Kingdom ............... 8905021

[51] Int. Cl.$^5$ .......................... C08K 3/18; C08K 3/22
[52] U.S. Cl. ................................ 524/433; 524/423; 524/424; 524/436; 524/456; 523/514
[58] Field of Search ............ 524/433, 436, 423, 424, 524/456; 523/514

[56] References Cited

U.S. PATENT DOCUMENTS

| | | |
|---|---|---|
| 3,300,325 | 1/1967 | Lindquist ............................ 524/433 |
| 3,822,224 | 7/1974 | Gillan et al. . |
| 3,879,314 | 4/1975 | Gunning et al. . |
| 4,001,827 | 1/1977 | Wallin et al. ........................ 428/919 |
| 4,461,849 | 7/1984 | Karickoff . |
| 4,489,174 | 12/1984 | Karickoff . |

FOREIGN PATENT DOCUMENTS

| | | |
|---|---|---|
| 1054178 | 2/1969 | United Kingdom . |
| 1288583 | 9/1972 | United Kingdom . |
| 1329985 | 9/1973 | United Kingdom . |
| 1332469 | 10/1973 | United Kingdom . |
| 1395065 | 5/1975 | United Kingdom . |
| 2065139A | 8/1988 | United Kingdom . |
| 2205154A | 11/1988 | United Kingdom . |

*Primary Examiner*—Paul R. Michl
*Assistant Examiner*—U. K. Rajgury
*Attorney, Agent, or Firm*—Banner, Birch, McKie & Beckett

[57] ABSTRACT

Compositions suitable for use as a camouflage material are based on vesiculated granules of polymer material which are substantially free of titanium dioxide but contain a light reflecting agent. The agent is an oxide, hydroxide or insoluble salt of magnesium or an insoluble mixed salt of calcium and magnesium and is present in an amount of at least 10 percent by weight of the polymeric material. Preferably the agent is dolomite. Paints containing the composition are useful as camouflage in snowy conditions and the aqueous paints are removable by scrubbing.

16 Claims, No Drawings

POLYMER GRANULES AND COMPOSITIONS CONTAINING THEM

This invention relates to polymer granules, particularly vesiculated granules and to compositions containing them which have immediate use in camouflage, particularly for military vehicles.

According to the present invention a composition suitable for use as a camouflage material comprises vesiculated granules of a polymer material said composition being substantially free of titanium dioxide and containing a light reflecting agent being an oxide, hydroxide or insoluble salt of magnesium or an insoluble mixed salt of calcium and magnesium and said light reflecting agent being present in the composition in an amount of at least 10 percent by weight of the polymeric material.

According to the present invention also a paint or a precursor thereof comprises a film-forming polymer, a liquid vehicle and dispersed therein a composition according to the immediately preceding paragraph.

The compositions of the present invention can be used to form paints which either are aqueous dispersion or non-aqueous types each containing an appropriate film-forming polymer or a precursor thereof and which when dry provide camouflage to articles or structures in a snowy environment.

Depending on the particular paint composition the dried paints can be easily removed by scrubbing or not as may be required. The paints when dry reflect light throughout the spectrum i.e. in the UV, IR and visible wavelength and, as described later, meet certain criteria and other laid-down specifications for such paints which cannot be attained with presently used pigmentary materials. For instance titanium dioxide pigmented paints are white and reflect infra-red radiation, but they absorb UV light and thus appear grey/black in a UV photograph.

The opacifying compositions of the present invention comprise granules of a polymer material which contain one or more vesicles the walls of which vesicles are provided by the polymer. Preferably the granules are substantially spherical and the vesicles occupy from 5% to 95% of the total volume of the granules. Most preferably the vesicles occupy from 20% to 80% of the volume of the granules.

The granules can have a wide range of sizes and can for instance be up to 250 microns in volume mean diameter. Usually granules have a volume mean diameter of at least 0.5 microns. Most usefully, the granules have a volume mean diameter of from 5 microns to 20 microns.

Typically the vesicles in the preferred granules will be substantially spherical in shape and have a diameter less than 20 microns and preferably from 0.1 to 7 microns, most preferably 0.1 to 1 micron.

Generally speaking the nature of the polymer is not critical provided due regard is taken of the final use of the dry granules or particles. The polymer can be a polyester, obtained by condensation of a polycarboxylic acid and a polyol, a polyester amide, a polyurethane, a urea-aldehyde resin, a cellulosic ester or any other suitable material. Preferably the polymer is an unsaturated polyester resin cross-linked with an unsaturated monomer.

Other types of polymer particles which may be used in the present invention are those known as water-insoluble core/sheath polymer particles and particularly those having a single vesicle per particle. In such particles the core is formed of polymeric material which will swell on contact with an appropriate substance and the sheath is formed of another polymeric material which is permeable to the substance required to react with the core.

The compositions of the present invention contain a light reflecting agent (an opacifying agent) which is an oxide, hydroxide or an insoluble salt of magnesium or an insoluble mixed salt of calcium and magnesium in an amount of at least 10 per cent of the dry weight of the polymer material. Preferably the amount of the light reflecting agent is at least 20 per cent by weight of the dry weight of the polymer material and most conveniently can be within the range 40 percent to 60 percent of the dry weight of the polymer material. The actual weights present depend on the particular light reflecting agent being used. Most conveniently the light reflecting agent is an insoluble mixed salt of calcium and magnesium particularly the mixed carbonate available as dolomite.

The light reflecting agent may be present within the polymer material itself or in a vesicle or in both and also some of the reflecting agent can be present externally of the granules. Preferably most of the reflecting agent will be within the granules with no more than 30 percent by weight of the agent being found external of the granules.

The granules can be formed by any suitable method but usually will involve the formation of a water-in-oil emulsion of a polymeric material, such as a polyester resin dissolved in an oily material e.g. styrene or a cross-linking monomer in which the water contains the light reflecting agent. This emulsion is then dispersed in a further aqueous phase. Polymerisation produces an aqueous dispersion of polymer granules having vesicles and containing the light reflecting agent.

The aqueous dispersion of polymer granules prepared by the preferred process can be used in its prepared form to manufacture a coating composition or the dispersion can be dried by the process as described in patent specification No. GB 2 205 154A and the dried composition then used to manufacture a coating composition, usually a non-aqueous composition. In the process described and claimed in specification GB 2 205 154A the aqueous dispersion is dried by heating in a non-oxygen containing atmosphere under such conditions of time and temperature that substantial deterioration of said particles is minimised.

The compositions of the present invention should be substantially free of any titanium dioxide and preferably no titanium dioxide is present in the composition at all. At most the compositions should contain no more than 1 percent by weight $TiO_2$ on weight of polymer material.

The compositions of the present invention can be used to form camouflaging paints or other coating compositions of a temporary or permanent kind by using the compositions as opacifying agents in the paint. Present also in the paint is a film-forming polymer or resin and a liquid vehicle so that the paints can be water-based, e.g. aqueous emulsion paints or solvent-based paints. The choice of the appropriate film forming polymer depends to a large extent on the type of paint which the polymer is to form. For instance with a water-based paint appropriate film forming polymers are polyacrylates, copolymers of styrene and acrylates, poly(vinylacetate) and copolymers of vinyl acetate with other vinyl esters, and/or with olefines, and with a solvent based paint filmforming polymers could be alkyd resins, polyurethane forming compositions or epoxy resins.

Generally speaking for use as snow camouflage paints the composition of the present invention should be free of any materials which introduce discolouring in the visible range. An example of such materials is an organic amine.

Aqueous based paints containing the compositions of the present invention have sufficient scrub resistance when dry to provide temporary coatings to equipment or buildings but the solvent based paints provide permanent coatings and may also contain some colouring agents when used in non-snowy conditions to produce conventional coloured camouflaging. Typically for use in a washable camouflage paint in a snowy environment a high amount of the composition of the present invention is present in the paint e.g. at least 80% particle volume concentration (pvc).

The use of the compositions of the present invention enables paints to be manufactured fully meeting the German Army Specification for white camouflage paints and such a paint has a reflectance curve according to the following parameters:

| Wavelength (nm) | | Reflectance % |
| --- | --- | --- |
| 300 | not less than | 57 |
| 320 | not less than | 63 |
| 340 | not less than | 69 |
| 360 | not less than | 76 |
| 380 | not less than | 80 |
| 400 | not less than | 83 |
| 450–700 | | 90% ± 4% |
| 700–1200 | | 86% ± 8% |

These reflectances are determined in accordance with the requirements of the German Army Specification, Federal Office for Defence Engineering and Procurement (BWB) TL 8010-351 Edition 1. January 1979.

The composition of the present invention can also be used in paint form to camouflage military vehicles and buildings as stated but also can be applied to ballistic missiles, aircraft and ships. The compositions can also be used as opacifying agent in plastics compositions or in synthetic textile compositions. Camouflaged clothing can be manufactured from such suitably opacified textile compositions.

The invention is illustrated in the following Examples in which all parts are by weight.

EXAMPLE 1

An unsaturated polyester resin was prepared by condensing together maleic anhydride, phthalic anhydride and propylene glycol in the molar ratio 3:1:4.5. The product had an acid value of 16 mg KOH per gram of solid resin.

Into 574 parts of a 59% weight solids solution of the above resin in styrene was milled 2.5 parts of magnesium oxide and 3.5 parts of a 1% solution of cobalt naphthenate in styrene, until they were thoroughly dispersed (around 30 minutes). To this mixture was added 262.5 parts of styrene and 63 parts of hot water (around 80° C.), and milling was continued for 1 minute. This oil phase was then left to stand for one hour.

Separately, 23.8 parts of a 90% weight solids aqueous solution of an ammonium nonylphenol ethoxylate sulphate surfactant were mixed with 7.14 parts of industrial methylated spirits and 16.66 parts of water. This was milled with 525 parts of water at 50° C., 0.1 part of an antifoaming agent and 436.4 parts of dolomite extender, to give an aqueous phase. The dolomite was sold under the name Microdol 1.

The above aqueous phase was slowly added to the oil phase with stirring, and the mixture was milled for 10 minutes to give a water-in-oil emulsion. This was immediately added to a further aqueous phase, containing 338.5 parts of a 1.5% weight solids solution of hydroxyethyl cellulose thickener, 556.9 parts of a 7.5% weight solution of polyvinylalcohol (as stabiliser) and 2063.6 parts of water, and was milled for 3 minutes, at which point a water-in-oil-in-water system had formed, with the oil globules averaging around 6 microns in diameter.

1091.9 parts of hot water were then added, with minimum possible milling, followed by 35 parts of cumene hydroperoxide. The slurry was kept at 50° C. overnight to ensure complete curing of the unsaturated polyester. This gave a 25.9% weight solids slurry of cross-linked polyester resin beads. The slurry was sieved through a 125 micron sieve and was treated with 27 parts of an acrylic thickener, to increase the slurry stability.

To test the slurry, a paint was made up to the following recipe;

| | PARTS |
| --- | --- |
| Water | 66.00 |
| Bead slurry | 236.25 |
| Hydroxyethyl cellulose | 2.88 |
| Ammonia | 0.60 |
| Sodium hexametaphosphate (25% solution) (CALGON PT) | 2.40 |
| Sodium salt of a polycarboxylic acid (25% solution) (OROTAN 731) | 2.40 |
| Butyl carbitol acetate | 9.66 |
| Antifoam | 0.60 |
| Biocide | 0.60 |
| Bead slurry | 236.25 |
| Vinylacetate/vinyl Versatate emulsion (55% solids) | 40.74 |

This gives a pvc (particle volume concentration) in the dry film of 90%.

The paint was applied to aluminium panels at a wet thickness of around 250 microns, and was allowed to dry. The reflectance spectrum was measured with a Beckman UV5240 spectrophotometer equipped with integrating sphere, at wavelengths between 300 and 400 nm (ultraviolet), 450 and 700 nm (visible) and 700 and 1200 nm (infra-red). The results were as follows:

| Wavelengths (nm) | Reflectance (%) |
| --- | --- |
| 300 | 63 |
| 320 | 77 |
| 340 | 85 |
| 360 | 89 |
| 380 | 89 |
| 400 | 89 |
| 450–700 | 88–87 |
| 700–1200 | 87–87 |

The gloss was measured with a Byk Labotron Multigloss glossmeter giving a result of 2% at 85°, against a requirement of less than 20% at 85°. The scrub resistance was measured by ASTM-D-2486-74a. After 30 double scrubs under a 600 g load, the paint film remained intact, and the reflectance and gloss were unchanged.

EXAMPLES 2-4

Paints were made up identical to that in Example 1, except that other pigments were used in place of the bead slurry. The total particle volume concentration of the dry paint was maintained at 90%.

After application to aluminium panels and drying, the paint films were tested for reflectance in the same way as in Example 1, with the following results:

| Wavelength | Reflectance (%) | | |
|---|---|---|---|
| | EXAMPLE 2 TiO$_2$ | EXAMPLE 3 Barium Sulphate | EXAMPLE 4 Dolomite |
| 300 | 14 | 69 | 88 |
| 320 | 12 | 70 | 86 |
| 340 | 11 | 72 | 88 |
| 360 | 12 | 72 | 89 |
| 380 | 16 | 72 | 87 |
| 400 | 42 | 72 | 87 |
| 450-700 | 99-98 | 72-76 | 87-86 |
| 700-1200 | 98-93 | 76-80 | 86-86 |

Scrub resistance testing was also carried out. All three paint films were completely removed before the end of the test. The titanium dioxide pigmented paint took 20 double scrubs, and the barium sulphate and dolomite paints took only 5, which is unacceptable.

In the above Examples the TiO$_2$ pigment was TIOXIDE TR92 (Registered Trade Mark), a general-purpose grade. The barium sulphate was Chinese barytes, and represents the prior state of the art in such coatings. The dolomite was the same material as was incorporated into the beads in Example 1.

We claim:

1. A composition suitable for use as a camouflage material comprises vesiculated granules of a polymer material said composition being substantially free of titanium dioxide and containing a light reflecting agent being an oxide, hydroxide or insoluble salt of magnesium or an insoluble mixed salt of calcium and magnesium and said light reflecting agent being present in the composition in an amount of at least 10 percent by weight of the polymeric material.

2. A composition according to claim 1 in which the granules contain vesicles which occupy from 5% to 95% of the total volume of granules.

3. A composition according to claim 1 in which the granules are substantially spherical and have a volume mean diameter of from 0.5 micron to 250 microns.

4. A composition according to claim 1 in which the granules have a volume mean diameter of from 5 microns to 20 microns.

5. A composition according to claim 1 in which the granules contain vesicles which are substantially spherical in shape and have a diameter of less than 20 microns.

6. A composition according to claim 5 in which said vesicles have a diameter of from 0.1 to 7 microns.

7. A composition according to claim 1 in which the polymer material is selected from the class of materials consisting of polyesters, polyurethanes, urea-aldehyde resins, and cellulosic ester resins.

8. A composition according to claim 1 in which the granules are core/sheath polymer particles.

9. A composition according to claim 1 in which the polymer particles each contain a single vesicle.

10. A composition according to claim 1 in which the amount of the light reflecting agent is at least 20 percent by weight of the dry weight of the polymer material.

11. A composition according to claim 1 in which the amount of the light scattering agent is from 40 percent to 60 percent of the dry weight of the polymer material.

12. A composition according to claim 1 in which the light reflecting agent is dolomite.

13. A composition according to claim 1 in which no more than 30 percent by weight of the light reflecting agent is external of the granules.

14. A composition according to claim 1 in which any titanium dioxide pigment present is no more than 1 percent by weight of TiO$_2$ on weight of polymer material.

15. A composition according to claim 1 which contains in addition a film-forming polymer and a liquid vehicle.

16. A composition according to claim 1 which contains in addition a film-forming polymer and water.

* * * * *